United States Patent [19]

Wilkinson

[11] 4,433,381
[45] Feb. 21, 1984

[54] CONTROL SYSTEM FOR AN INTERNAL COMBUSTION ENGINE

[75] Inventor: John R. Wilkinson, Dearborn, Mich.

[73] Assignee: The Bendix Corporation, Southfield, Mich.

[21] Appl. No.: 401,439

[22] Filed: Jul. 23, 1982

Related U.S. Application Data

[62] Division of Ser. No. 188,803, Sep. 19, 1980, Pat. No. 4,380,800.

[51] Int. Cl.³ .............................................. G06F 15/20
[52] U.S. Cl. .............................. 364/431.05; 123/416; 123/478; 364/174
[58] Field of Search ...................... 364/431.03, 431.04, 364/431.05, 431.07, 431.08, 167, 174; 123/415, 414, 416, 418, 419, 425, 435, 436, 478, 480; 73/116, 462, 659, 660, 117.2, 117.3

[56] References Cited

U.S. PATENT DOCUMENTS

| | | | |
|---|---|---|---|
| 3,733,892 | 5/1973 | Rennick | 73/659 |
| 3,749,070 | 7/1973 | Oishi | 123/422 |
| 3,789,816 | 2/1974 | Taplin et al. | 123/436 X |
| 3,800,599 | 4/1977 | Goran | 73/116 |
| 3,872,846 | 3/1975 | Taplin et al. | 123/568 |
| 3,885,420 | 5/1975 | Wolfinger | 73/650 |
| 3,897,766 | 8/1975 | Pratt, Jr. et al. | 123/426 |
| 3,935,846 | 2/1976 | Zelenka | 123/457 |
| 4,015,566 | 4/1977 | Wahl | 123/415 |
| 4,015,572 | 4/1977 | Leshner | 123/457 |
| 4,018,087 | 4/1977 | Wenz | 73/462 |
| 4,026,251 | 3/1977 | Schweitzer et al. | 123/436 |
| 4,044,234 | 8/1977 | Frobenius et al. | 123/436 X |
| 4,044,235 | 8/1977 | Frobenius et al. | 123/436 X |
| 4,044,236 | 8/1977 | Bianchi et al. | 123/431.06 |
| 4,064,846 | 12/1977 | Latsch et al. | 123/436 X |
| 4,092,955 | 6/1978 | Reddy | 73/650 |
| 4,104,990 | 8/1978 | Frobenius | 123/436 |
| 4,112,879 | 9/1978 | Assenheimer | 123/478 |
| 4,140,083 | 2/1979 | Frobenius | 364/431.08 |
| 4,161,162 | 7/1979 | Latsch et al. | 123/435 |
| 4,172,433 | 10/1979 | Bianchi et al. | 123/436 X |

FOREIGN PATENT DOCUMENTS

| | | | |
|---|---|---|---|
| 966223 | 4/1975 | Canada | 364/431.08 |
| 1512213 | 5/1978 | United Kingdom | 364/431.08 |
| 1520427 | 8/1978 | United Kingdom | 364/431.08 |

OTHER PUBLICATIONS

Randall et al., "Closed Loop Control of Internal Combustion Engine Efficiency and Exhaust Emissions", Stanford University Research Report DOT-05-30111, May 1976, pp. 29-34.

Primary Examiner—Joseph F. Ruggiero
Attorney, Agent, or Firm—Russel C. Wells; Markell Seitzman

[57] ABSTRACT

A control system for an internal combustion engine wherein the control signal to generate fuel and/or ignition commands is a function of the change of velocity of a movable member, such as a crankshaft flywheel, at a position coupled with the desired velocity of the movable member at that position. The control signal may comprise at least two components wherein the first component represents the difference in magnitude of the peak velocity of the movable member at the two positions and the second signal represents the difference in the two position of the member at which the peak velocities occur.

11 Claims, 3 Drawing Figures

CONTROL SYSTEM FOR AN INTERNAL COMBUSTION ENGINE

This is a division, of application Ser. No. 188,803, Pat. No. 4,380,800, filed Sept. 19, 1980, which is a Continuation of Ser. No. 904,132, filed May 8, 1978, and now abandoned.

CROSS REFERENCE TO AND INCORPORATION OF RELATED CO-PENDING APPLICATIONS

This application is a divisional application of one of six applications originally filed on May 8, 1978 all commonly assigned and having substantially the same specification and drawings, the six applications being identified below:

| Parent Ser. No. | Continuation Ser. No. | U.S. Pat. No. | Title |
|---|---|---|---|
| 904,131 | 187,400 | 4,357,662 | Closed Loop Timing and Fuel Distribution Control |
| 904,132 | 188,803 | 4,380,800 | Digital Roughness Sensor |
| 904,137 | 187,392 | 4,375,668 | Timing Optimization Control |
| 904,138 | 187,393 | 4,347,571 | Integrated Closed Loop Engine Control |
| 904,139 | 187,394 | 4,344,140 | Closed Loop Engine Roughness Control |

Application Ser. No. 904,129, now U.S. Pat. No. 4,197,767, which issued Apr. 15, 1980 and has been printed in its entirety, including FIGS. 1–56, and the specification of that patent is specifically incorporated herein by reference.

CROSS REFERENCE

The disclosed invention is related to the commonly-assigned patent application Ser. Nos. 904,138, 904,139, 904,131 and 904,137 concurrently filed, all now abandoned and continuing patent application Ser. Nos. 187,393, 187,394, 187,400, 187,392, respectively and U.S. Pat. No. 4,197,767 issued Apr. 15, 1980, having Ser. No. 904,129.

BACKGROUND OF THE INVENTION

1. Field of the Invention

The invention is related to engine roughness sensors, and in particular to an engine roughness sensor detecting the instantaneous rotational velocity of the engine's crankshaft and generating a speed normalized roughness signal.

2. Prior Art

Electronic ignition and fuel control systems for internal combustion engines are finding acceptance in the automotive and allied industries as rigid efficiency and pollution standards are imposed by the government. The first generation of these electronic controls were open loop systems which became progressively complex as the standards were raised. The number of variables needed to be detected as well as auxiliary circuits for providing corrections for these variables increased with each raising of the standards. From the conception of electronic control systems for internal combustion engines, it has been known that if the control systems could be closed about the engine, simpler control systems could be developed. This would reduce the number of variables needed to be detected, reduce the complexity of the control systmes, and at the same time improve the overall efficiency. The problem that has plagued the industry is the selection of an appropriate engine parameter about which to close the loop.

K. W. Randall and J. D. Powell from Stanford University in their research under a Department of Transportation sponsored project determined that for maximum efficiency of an internal combustion engine, the spark timing should be adjusted to provide a maximum cylinder pressure at a crankshaft angle 15 degrees past the piston's top dead center position. The results of this investigation are published in a Final Report NO SU-DAAR-503 entitled "Closed Loop Control of Internal Combustion Engine Efficiency and Exhaust Emission". The report contains a block diagram of a closed loop system in which a sensor detects the angle at which peak pressure occurs then compares this measured angle with the desired 15° angle. An error signal, generated when the measured angle differs from the desired angle, is used to correct the ignition timing signal generated in response to the other sensed engine parameters.

Comparable closed loop ignition control systems closed about the cylinder pressure are disclosed by M. M. Peterson in U.S. Pat. No. 3,957,023 entitled "Pressure Responsive Engine Ignition System" issued May 19, 1976 and Sand in U.S. Pat. No. 3,977,373 "Closed Loop Combustion Pressure Control" issued Aug. 31, 1976.

An alternate closed loop ignition control system taught by Pratt, Jr. et al. in U.S. Pat. No. 3,897,766 entitled "Apparatus Adapted to Opto-Electrically Monitor the Output of a Prime Mover to Provide Signals which are Fed Back to the Input and Thereby Provide Control of the Prime Mover" issued Aug. 5, 1975 embodies a torque sensor which measures the twist in the output shaft of the prime mover to measure the torque. The measured torque and engine speed are used to close the loop about the engine.

Harned et al. in U.S. Pat. No. 4,002,155 entitled "Engine and Engine Spark Timing Control with Knock Limiting, etc." issued Jan. 11, 1977 teaches a closed loop ignition system in which engine knock-induced vibrations are detected by an engine mounted accelerometer. The system counts the number of individual ringing vibrations that occur in a predetermined angular rotation of the crankshaft. When the number of ringing vibrations exceed a predetermined number, the engine spark timing is retarded and when the number of ring vibrations is less than a second predetermined number, the spark timing is advanced.

Wahl in U.S. Pat. No. 4,015,566 entitled "Electronic Ignition Control System for Internal Combustion Engines" issued Apr. 5, 1977 teaches a closed loop ignition timing system closed about an operational parameter of the engine. In his patent, Wahl teaches sensing the temperature of a catalytic converter, the exhaust gas composition (especially NO compounds), or in the alternative using a vibration sensor to detect a rough running engine. The use of engine roughness as the measured parameter is similar to the system taught by Harned in U.S. Pat. No. 4,002,155 discussed above. In still another type of close loop system, Schweitzer et al. in U.S. Pat. No. 4,026,251 entitled "Adaptive Control System for Power Producing Machines" issued May 31, 1977 teaches dithering the ignition timing and closing the loop about the engine's speed.

The closed loop ignition timing systems in which the cylinder pressure is measured directly as taught by Randall and Powell and implemented in the patents to Peterson and Sand appear as the most direct and effective engine parameter about which to close the loop. However, this method requires a pressure transducer to be incorporated into at least one of the engine's cylinders where it is exposed to high temperatures and high pressures. Such pressure sensors are costly, have relatively short life expectancies and require additional modification to the engine for their use. Alternatively, pressure sensors adapted to be used in conjuction with the spark plugs are known but still suffer from the first listed deficiencies. The direct measurement of engine torque as taught by Pratt, Jr. et al. is an alternate approach but requires a relatively complex and expensive torque measuring sensor. The measurement of the onset of engine knock or roughness as taught by Harned et al and Wahl respectively are believed to be too inaccurate to meet today's standards while the system taught by Schweitzer is believed to be ineffective because factors other than ignition timing such as a change in load could affect the engine speed and result in inproper ignition timing.

Various types of closed loop fuel control systems for internal combustion engines have been developed in which the loop is closed about different engine parameters. The one of the parameters about which the loop is closed is the composition of the exhaust gas as taught by Seitz in U.S. Pat. No. 3,815,561 "Closed Loop Engine Control System" issued June 11, 1974 as well as many others. The system taught by Seitz uses an oxygen ($O_2$) sensor detecting the concentration of oxygen in the exhaust gas and closes the loop about a stoichiometric mixture of air and fuel. However, a stoichiometric mixture of air and fuel has been found to be too rich for the efficient operation of the engine. Various techniques have been employed to operate the engine at leaner air fuel ratios but the ability to achieve reliable closed loop control at the desired leaner mixture is limited by the characteristics of the present day oxygen sensors.

An alternate approach is taught by Taplin et al in U.S. Pat. No. 3,789,816 "Lean Limit Internal Combustion Engine Roughness Control System" issued Feb. 5, 1974 in which engine roughness is detected as the parameter about which the loop is closed. In this system, the airfuel mixture is leaned out until a predetermined level of engine roughness is achieved. The magnitude of engine roughness is selected to correspond with a level of engine roughness at which the air fuel mixture is made as lean as possible to the point that the formation of such exhaust gas as HC and CO is minimized without the drivability of the particular vehicle being unacceptable. Engine roughness as measured in the Taplin et al patent is the incremental change in the rotational velocity of the engine's output as a result of the individual torque impulses received from each of the engine's cylinders. The closing of the fuel control loop about engine roughness appears to be the most effective means for maximizing the fuel efficiency of the engine.

Leshner et al. in U.S. Pat. No. 4,015,572 teaches a similar type of fuel control system in which the loop is closed about engine power. In their preferred embodiment, Leshner et al. use exhaust back pressure as a manifestation of engine power, however, state that a measured torque, cylinder pressure, or a time integral of overall combustion pressure for one or more engine revolutions at a given RPM may be used in the alternative. In a more recent advertising brochure "Breaking the Lean Limit Barrier", Fuel Injection Development Corporation of Bellmawr, N.J., the assignee of the Leshner et al. patent, states that the parameter measured is the velocity of the engine's flywheel.

In another type of fuel control system using engine roughness as the sensed parameter to close the loop, Bianchi et al in U.S. Pat. No. 4,044,236 teaches measuring the rotational periods of the crankshaft between two sequential revolutions of the engine. The differential is digitally measured in an up down counter counting at a frequency proportional to the engine speed.

In an alternate type of roughness closed loop fuel control system, Frobenius et al. in U.S. Pat. No. 4,044,234 "Process and Apparatus for Controlling Engine Operation Near the Lean-Running Limit" issued August, 1977, teaches measuring the rotational periods of two equal angular intervals, one before and one after the top dead center position of each piston. The change in the difference between the two rotational periods for the same cylinder is compared against a particular reference value and an error signal is generated when the change exceeds the reference value. Frobenius in U.S. Pat. No. 4,044,235 "Method and Apparatus For Determining Smooth Running Operation in an Internal Combustion Engine" issued August, 1977 teaches an alternate roughness control system wherein the periods of three sequential revolutions are compared to determine engine smoothness. The above reflects various ways in which engine roughness as detected by various means including the variations in the rotational velocity of the flywheel is used to close the loop about the engine.

The prior art teaches independent closed loop control systems, in which each control, i.e., ignition timing, fuel control, and fuel distribution are treated as separate entities. The Applicants herein teach an integrated engine control system in which the control loops for each controlled parameter are closed about a single measured engine operating parameter and in particular, the instantaneous rotational velocity of the engine's crankshaft. The data obtained from the singularly measured parameter is processed in different ways to generate timing and fuel delivery correction signals optimizing the conversion of combustion energy to rotational torque by the engine.

SUMMARY OF INVENTION

The invention is a control system for an internal combustion engine, either spark-ignited or compression-ignited, wherein the engine has an output member. The output member moves, either linearly or rotationally, in response to combustion of fuel in the engine. The combustion of the fuel in the engine occurs in a chamber on a cyclic basis. The movement of the output member is sensed by various means and as a result, an operating signal is generated. This operating signal indicates the position of the output member from a predetermined position. In addition, the velocity of the output member is determined from the operating signal.

Another means generates a reference signal which indicates the desired velocity of the output member at each position from a predetermined position. Both the operating and the reference signals are sequentially generated for each combustion cycle. Each of these signals, the operating signal and the reference signal, are supplied to a control means. The control means, in response to the two signals, generates a control signal to control an operating parameter of the engine.

In one embodiment, the control signal is a function of the change of velocity of the output member. This change is with respect to the position of the output member for both the operating and reference signals.

In a second embodiment, the control signal is a function of the magnitude of the peak velocity of the operating signal and the reference signal. In addition the control signal is a function of the magnitude of position of the output member at which the peak velocity occurs and the magnitude of the position of the output member at which the peak velocity of the reference signal occurs. These magnitudes are combined by the control means to control an operating parameter of the engine. More particularly, the control signal has a first signal which represents the differences of the peak velocities, a second signal which represents the differences of the position at which the peak velocities occur and a third signal which is a function of the first and second signals.

In still another embodiment, the control signal is a function of the deviation between the velocity components of the operating and reference signals at a predetermined position and of the deviation between the position component of the operating and reference signals at a predetermined velocity of the output member.

Another embodiment has the control signal generated as a function of the magnitude of a deviation from corresponding components of the operating signal and the reference signal. Other embodiments of the invention will be apparent from the reading of the complete specification in the referenced U.S. Pat. No. 4,197,767.

Figure 54:
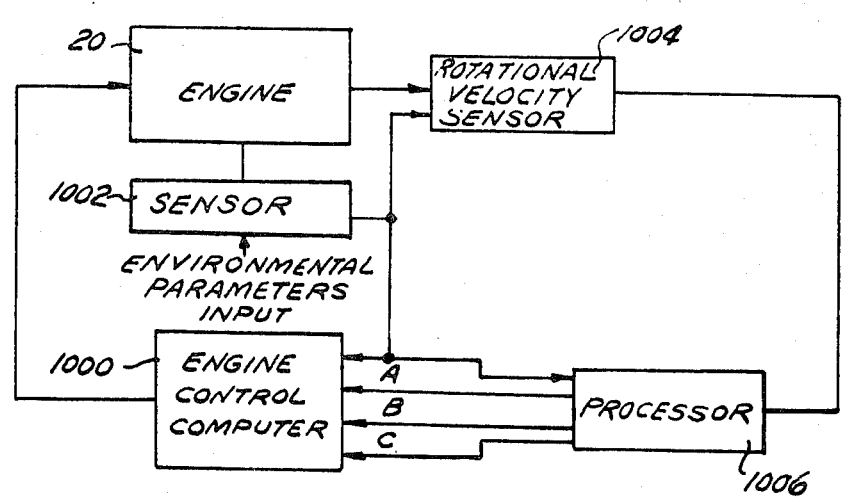
FIG. 54 is a block diagram of a control system for an internal combustion engine having multiple control loops.
Figure 55:
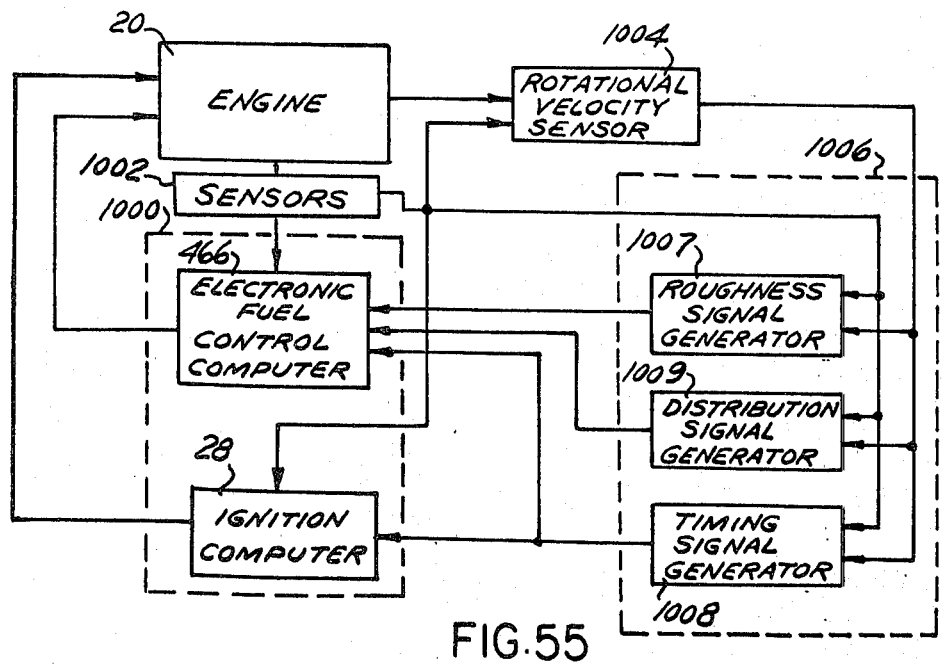
FIG. 55 is a block diagram of a control system for a spark ignited engine.
Figure 56:
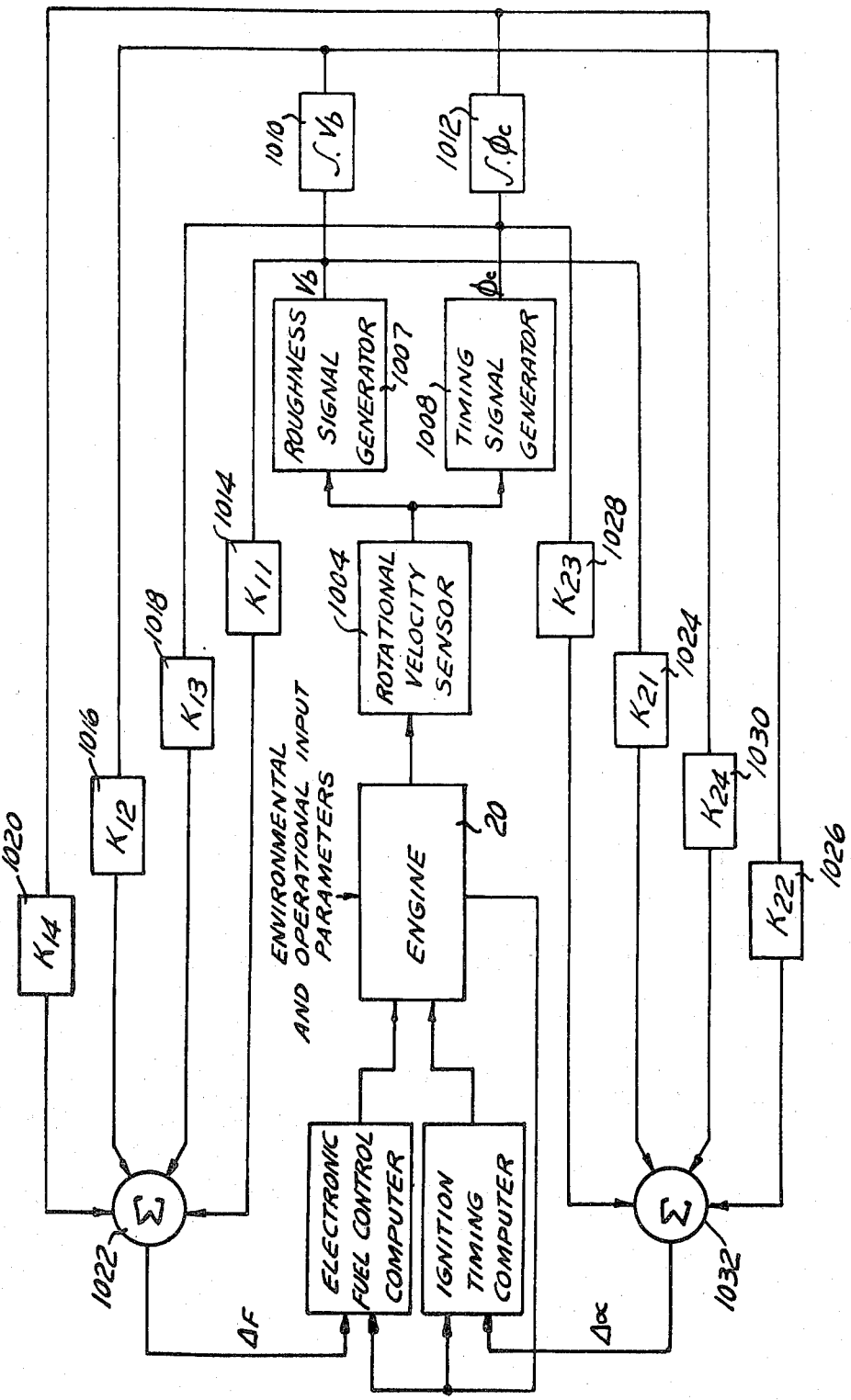
FIG. 56 is a block diagram of a control system for an internal combustion engine having a state variable matrix.

For a better understanding of the drawing figures in this application, reference is made to the same figure numbers of the above referenced U.S. Pat. No. 4,197,767.

What is claimed is:

1. A control system for an internal combustion engine of the type having a movable output member which moves in response to combustion of fuel in at least one chamber in said engine, said control system comprising:
   means responsive to the movement of the output member for generating an operating signal which is a function of the actual velocity and position of the output member from a predetermined position;
   means for generating a reference signal which is a function of the actual velocity and position of the output member from a predetermined position;
   control means responsive to said operating signal and reference signal for generating a control signal which is a function of the change of velocity of the output member with respect to position of the output member for both said operating signal and said reference signal to control an operating parameter of the engine.

2. A control system as recited in claim 1 wherein the combustion in the chamber occurs cyclically and wherein said operating signal and said reference signal are sequentially generated for each combustion cycle.

3. A control system for an internal combustion engine of the type having a movable output member which moves in response to the combustion of fuel in at least one chamber in said engine, said control system comprising:
   means responsive to the movement of the output member for generating an operating signal which is a function of the actual velocity and position of the output member from a predetermined position;
   means for generating a reference signal which is a function of a desired velocity and position of the output member from said predetermined position; and
   control means responsive to said operating signal and said reference signal for generating a control signal which is a function of the magnitudes of the peak velocity of said operating signal and said reference signal and the position of the output member at which the peak velocity of said operating signal occurs, and the position of the output member at which the peak velocity of said reference signal occurs to control an operating parameter of the engine.

4. The control system as recited in claim 3 wherein said control signal comprises a first and second signal, said first signal is a function of the differences of the magnitudes of said peak velocities of said operating signal and said reference signal and said second signal is a function of the differences of said positions at which said peak velocities occur.

5. A control system as recited in claim 4 wherein said control signal includes a third signal which is a function of said first and second signal.

6. A control system as recited in claim 3 or 4 wherein the combustion in the chamber occurs cyclically and wherein said operating signal and said reference signal are generated for sequential combustion cycles.

7. A control system for an internal combustion engine of the type having a movable output member which moves in response to the combustion in at least one chamber in said engine, said control system comprising:
   means responsive to the movement of the output member for generating an operating signal which is a function of the actual velocity and position of the output member from a predetermined position;
   means for generating a reference signal which is a function of a desired velocity and position of the output member from said predetermined position; and
   control means responsive to said operating signal and said reference signal for generating a control signal which is a function of a deviation between the velocity component of said operating signal and said reference signal at a predetermined position and a deviation between the position component of said operating signal and said reference signal at a predetermined velocity to control an operating parameter of the engine.

8. The control system as recited in claim 7 wherein said predetermined velocity is a peak velocity, and wherein said control signal comprises a first and second signal, said first signal is a function of the differences of the magnitudes of said peak velocities and said second signal is a function of the differences of said positions at which said peak velocities occur.

9. A control system as recited in claim 8 wherein said control signal includes a third signal which is a function of said first and second signal.

10. A control system as recited in claim 7 or 8 wherein the combustion in the chamber occurs cyclically and wherein said operating signal and said reference signal are generated for sequential combustion cycles.

11. A control system for an internal combustion engine of the type having a movable output member which moves in response to the combustion in at least one chamber of said engine, said control system comprising:

means responsive to the movement of the output member for generating an operating signal which is a function of the actual velocity and position of the output member from a predetermined position;

means for generating a reference signal which is a function of a desired velocity and position of the output member from said predetermined position; and control means responsive to said operating signal and said reference signal for generating a control signal which is a function of a deviation between the magnitude of two different components of said operating signal from corresponding components of said reference signal to control an operating parameter of the engine.

* * * * *